H. R. MINNS.

Glove-Fasteners.

No. 129,900.    Patented July 30, 1872.

Witnesses:
Wm. H. Duhamel
Fredk Artos

Inventor:
Henry R. Minns.
By James L. Norris.
Associate Attorney.

UNITED STATES PATENT OFFICE.

HENRY ROYALL MINNS, OF BRISTOL, ENGLAND.

IMPROVEMENT IN GLOVE-FASTENERS.

Specification forming part of Letters Patent No. 129,900, dated July 30, 1872.

Specification describing certain Improvements in Fastenings for Gloves, &c., invented by HENRY R. MINNS, of Stapleton road, city and county of Bristol, England.

My invention relates to certain improvements in fastenings for gloves, &c.; and consists of two pieces of metal wire or other material, with their ends connected together or lapping on each other to form a hook, one end of each hook being attached to opposite sides of a glove, and so constructed as to be hooked upon a knob upon the ends of a piece of elastic material, all as will be fully hereinafter set forth.

Figure 1:
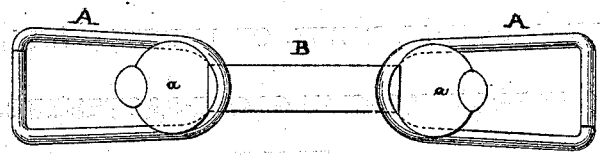
Figure 2:
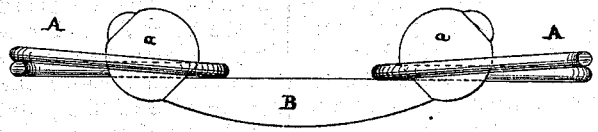

In the drawing, Figure 1 is a top or plan view of my improved fastening, and Fig. 2 a side view of the same.

A A represent two hooks or links formed of a piece of metal or other material, their ends being connected together to form an inclosure of the shape shown in the drawing, and so constructed as to be slightly elastic in order to grasp the knob, each hook being attached to opposite sides of a glove. B represents a piece of elastic material, in the present instance consisting of rubber, and being provided at each end with a small knob, a, of a size corresponding to the opening of the hook A.

When it is desired to fasten the glove, one of the knobs a is passed through the opening in the hook A, and spreading its spring-jaws in so doing; then the remaining knob is likewise passed through the other hook on the opposite side of the glove, when, owing to the elasticity of the connecting-piece B, the sides of the glove are drawn together and thus securely fastened.

By this means a cheap and very efficient glove-fastening is produced, which may be employed with equal facility for other purposes—as, for instance, for fastening corsets, &c.

What I claim as my invention is—

A fastening consisting of the hooks A A, elastic piece B, and buttons or knobs a a, substantially as and for the purpose specified.

HENRY ROYALL MINNS.

Witnesses:
  BENJ. BROWNE,
    *85 Gracechurch St., London.*
  ALEX. BROWNE,
    *85 Gracechurch St., London.*